Patented June 10, 1941

2,244,703

UNITED STATES PATENT OFFICE 2,244,703

WATER SOLUBLE SALTS OF INTERPOLYMERS CONTAINING METHACRYLIC ACID

Leo Phillip Hubbuch, Springfield, Pa. assignor to E. I. du Pont de Nemours & Company, Wilmington, Del., a corporation of Delaware No Drawing. Application April 16, 1938, Serial No. 202,471

13 Claims. (Cl. 260—84)

This invention relates to the manufacture of polymerization products possessing unusual characteristics and desirable physical properties which render them valuable for use as ingredients in coating compositions, for the sizing of textile materials, and for use as tanning agents.

The products resulting from the polymerization of the nitrile, amide and esters of methacrylic acid have in the past few years become of considerable importance in the plastic and allied arts, due, primarily, to their unusual physical and chemical properties. These polymeric products, however, are more or less water-insoluble, and, accordingly, they have been restricted in their use to applications wherein water-insoluble products are required. It has been appreciated that could these materials be rendered water soluble, without appreciable loss of their other valuable properties, their utility could be extended.

An object of the present invention is to provide a process of preparing water-soluble polymerization products of methacrylyl derivatives. Another object of the invention is to provide interpolymers resulting from the copolymerization of monomeric methacrylic acid with other polymerizable derivatives of this acid. Yet another and more specific object of the invention is to provide water-sensitive interpolymers containing methacrylic acid and an ester of methacrylic acid. Still another object of the invention involves partially or completely neutralizing interpolymers of methacrylic acid and another polymerizable methacrylic acid derivative to give water-soluble interploymer salts. Other objects and advantages of the invention will hereinafter appear.

According to the invention polymerization products, having new properties, are made by subjecting to polymerization a mixture comprising 30–98% by weight of monomeric methacrylic acid and from 70–2% of another polymerizable compound or mixture of polymerizable compounds and, preferably, another dissimilar polymerizable derivative of methacrylic acid, and subsequently neutralizing the resulting interpolymer. The interpolymer salts, thus obtained, may include, prior to neutralization, methacrylic acid, within the limits designated, with one or more of the following compounds: the esters of methacrylic acid, and more particularly the methyl, ethyl, propyl, butyl, isobutyl, cyclohexyl or higher alcohol esters of methacrylic acid, as well as the nitrile or amide of methacrylic acid. Interpolymer salts may likewise be provided in accord with the invention by neutralizing the interpolymers of methacrylic acid with acrolein, methyl, vinyl ketone, vinyl isobutyl ether, or the vinyl organic or inorganic esters, e. g., vinyl chloride, vinyl acetate, vinyl chloracetate, styrene, as well as such polymerizable compounds as butadiene and unsymmetrical dichlorethylene.

The polymerization is effected by subjecting the mixture of the monomeric methacrylic acid and the other monomeric polymerizable compound to the action of radiant energy (heat and/or light), oxygen, or oxygen-containing substances, separately or together. Any of the polymerization promoting catalysts may be used, but I prefer to use benzoyl peroxide and other organic or inorganic peroxides. The polymerization may be effected in a solvent of the monomers, or by first dispersing the monomers as an emulsion, in a non-solvent medium, and while in that form, polymerizing them to give an emulsion polymer, or temporarily dispersing them in a non-solvent, polymerizing them while in that metastable form and thereby obtaining a granular polymer in accord with the process disclosed in U. S. Patent No. 2,108,044.

The unneutralized interpolymers so obtained have valuable properties that differ from the properties of mere mixtures of the separately polymerized ingredients. The properties naturally vary, according to the properties of the ingredients, and in some instances, as a linear function of the components. It is believed that the polymerization takes place in such a manner that the chains of the monomer residues are mixed and the nature of the product depends on the particular way in which these mixed chains are linked together. Generally, the amount of polymeric methacrylic acid in the interpolymer governs in large measure the water sensitivity of the resin and I have found that the more acid present the more water sensitive is the resulting interpolymer.

The interpolymer salts, because of their extended solubility characteristics, have properties which fit them for use in a number of arts to which the separate ingredients or a mixture of the polymers are not adaptable. These uses are dependent upon the conversion of the interpolymer to water-soluble materials. The conversion is effected by solution of the interpolymer in an aqueous alkali such, for example, as an aqueous solution of the alkali metal or ammonium hydroxides or carbonates or the organic bases, e. g., water-soluble amines, such as, methyl amine, ethyl amine, triethanol amine, pyridine, etc. My interpolymer, prior to neutralization, should, preferably, not contain less than 40% methacrylic acid, since such products polymerized by usual methods, are difficultly soluble when neutralized, while those containing more than 98% acid give resins, or salts, having characteristics which approach those of the acid or salts of the acid. If the polymerization is carried out under conditions which give low molecular weight polymers, such as are illustrated by the process of Example 1, water solubility of the salt is extended down to include the interpolymers containing but 30% methacrylic acid. The compositions which applicant has found to be well fitted for a number of uses which require water-soluble products consists, therefore, of the salts of the interpolymers containing from 30 to 40% methacrylic acid, if low molecular weight acid is used, and from 40 to 98%, and preferably from 65 to 85% methacrylic acid of any desired molecular weight, the remainder, in all cases, being a nitrile, amide or ester of methacrylic acid. The interpolymers of methacrylic acid with its esters and especially the lower esters, i. e., those containing from 1 to 4 carbon atoms in the alkyl group are preferred as well as the salts of these esters. The proportion of acid to ester will, of course, vary in accord with the selected use for the interpolymer or salt. For example, as a warp size for the treatment of textile fabrics, a salt of the composition containing 75% methacrylic acid and 25% methacrylate has special utility.

It is not necessary to completely neutralize the acid portion of the interpolymer for it has been found that, in many instances, water solubility is obtained when only a portion of the theoretical amount of alkali is added.

The solution of the acid-ester interpolymer in a bath containing an alkali results in the formation of a salt of the interpolymer. This interpolymer salt, whether or not it contains unneutralized methacrylic acid, may, if desired, be separated from the solution in which it is formed by precipitation or other means, such, for example, as precipitating the salt from the aqueous solution by the addition of a non-solvent therefor such as methyl alcohol, ethyl alcohol and the like, and removing it from the solution by drum drying or other suitable means. For many uses it has been found desirable to dissolve the interpolymer in an aqueous bath containing an alkali and then apply the resulting solution. A solution of the salt in water, or other suitable solvent, will generally give, however, equally good results.

The invention is illustrated but not limited by the following examples, in which the parts are by weight:

*Example I*

75 parts of alpha methacrylic acid (hereafter referred to simply as "methacrylic acid"), 25 parts of the methyl ester of alpha-methacrylic acid (hereafter referred to as "methyl methacrylate") and one part of benzoyl peroxide were dissolved in 500 parts of toluene and heated in a flask with a reflux condenser for twelve hours at the boiling point. Interpolymerization of methacrylic acid and methyl methacrylate occurred and the interpolymer separated as a finely divided white powder.

100 parts of this powder were stirred into a solution containing about 600 parts of water and 30 parts of sodium hydroxide. Steam was then bubbled into this mixture with rapid stirring. The material dissolved readily as the boiling point of the solution was approached. A total of approximately 35 parts of caustic was added. When all of the resin had dissolved additional water was added to give a total of 1000 parts of solution. This solution thus contained 10% of an interpolymer, calculated as a free acid, and was found to be particularly suitable for the sizing of viscose rayon yarn.

*Example II*

50 parts of methacrylic acid, 50 parts of methyl methacrylate and 1 part of benzoyl peroxide were dissolved in toluene and heated to interpolymerize the acid and ester. A finely divided powder separated. The acid number of this powder was 320. 10 parts of this resin were dissolved by the method described in Example I, in 90 parts of water, except that only 23 parts of sodium hydroxide were required to effect solution.

*Example III*

30 parts of methacrylic acid and 70 parts of methyl methacrylate were interpolymerized in accord with the process of Example I to yield a fine white powder with an acid number of 192. The solution of this interpolymer required only 12 parts of sodium hydroxide per 10 parts of the powder in 90 parts of water to give a solution having much higher viscosity than the solution in Example I.

*Example IV*

87.5 parts of methacrylic acid and 12.5 parts of methyl methacrylate were interpolymerized in accord with the process of Example I to give a fine white powder having an acid number of 570. 38 parts of sodium hydroxide were required to solubilize 100 parts of the resin in 600 parts of water.

*Example V*

35 parts of methacrylic acid and 65 parts of propyl methacrylate were heated in accord with the process of Example I, giving an acid number of 238. 100 parts of this resin were stirred into a solution of 16 parts of sodium hydroxide and 600 parts of water to give a complete solution of the resin.

The method of preparing the interpolymers of this invention has been illustrated in the above examples, with special reference to toluene as the solvent. However, the method is not limited to the use of toluene, for in its place other solvents may be used such as benzene, xylene, ether, methyl alcohol, ethyl alcohol, etc. Solvents may be dispensed with entirely and a granulated product or an emulsified product may be made by dispersing the methacrylic acid and the other polymerizable compound in the desired proportions, in the presence of a catalyst, in a non-solvent medium, and then polymerizing the mixture of monomers in granular or emulsified form. In this manner the interpolymer is produced in the form of an emulsion or as fine granules which can be conveniently treated in the manner and in accord with the described processes.

The preparation of a granulated interpolymer is illustrated by the following example:

*Example VI*

108 grams of methylated starch were added to 15 gallons of water in a Pfaudler kettle equipped with a reflux and an efficient mechanical stirrer. The methylated starch was dissolved in the water by stirring and heating to 80° C. At this point the stirrer was stopped and a solution of 5.9 pounds of monomeric methyl methacrylate, 17.7 pounds of monomeric methacrylic acid and 108 grams of benzoyl peroxide were added. The stirring device was again started and indirect heating applied until a temperature of 90° C. was reached in the charge, followed by cooling which was necessary to maintain this internal temperature. Approximately 40 minutes were required from the addition of the monomer until polymerization was completed. Polymerization was essentially completed at the time refluxing was no longer obtained at 90° C. and was also evidenced by a drop in the internal temperature. The polymer appears as very fine, solid granules which were dispersed in the aqueous phase as long as stirring was continued and which settled when stirring was stopped. If desired, the polymer slurry may be filtered or centrifuged and dried to obtain the acid ester interpolymer in a dry, solid form, or the interpolymer may be converted to the water-soluble sodium salt by transferring the entire polymer slurry to a vessel containing a stirred solution of 8 pounds of sodium hydroxide and 10.5 gallons of water, the resulting mixture being stirred until the interpolymer is completely dissolved.

As has been indicated my interpolymers may be used for various purposes such, for example, as the preparation of molded articles while the alkali salts thereof are particularly suitable for use in the sizing of textile materials as well as the tanning of hides, the coagulation of gelatin, as a dispersing agent, for pigments; in the photographic arts, as an anti-halation layer or "daylight loading" light protecting layer; as an adhesive, and many other important uses in the art.

From a consideration of the above specification it will be appreciated that many changes may be made in the details therein given without sacrificing any of the advantages thereof or departing from the scope of the invention.

I claim:

1. A process for the manufacture of a water-soluble interpolymer salt which comprises subjecting to polymerizing conditions a mixture comprising from 30 to 98% of monomeric methacrylic acid and 70 to 2% of at least one compound of the group consisting of the nitrile, amide, and esters of methacrylic acid, the mixtures containing from 30 to 40% methacrylic acid being polymerized to interpolymers of molecular weight at least as low as that obtained by refluxing the mixture in toluene and in the presence of approximately 1% benzoyl peroxide, based on the total weight of polymerizable compounds present, for approximately 12 hours, and subsequently converting the interpolymer to a water-soluble salt.

2. A process for the manufacture of a water-soluble interpolymer salt which comprises subjecting to polymerizing conditions while in the presence of benzoyl peroxide a solution of 40 to 98% monomeric methacrylic acid and 60 to 2% of at least one compound of the group consisting of the nitrile, amide, and esters of methacrylic acid and subsequently converting the interpolymer to a water-soluble salt.

3. A process for the manufacture of a water-soluble interpolymer salt which comprises subjecting to polymerizing conditions a solution of 65 to 85% monomeric methacrylic acid and 35 to 15% of at least one compound of the group consisting of the nitrile, amide, and esters of methacrylic acid and subsequently reacting the interpolymer with a compound selected from the group consisting of alkali metal and ammonium hydroxides, alkali metal and ammonium carbonates and organic bases.

4. A process for the manufacture of a water-soluble interpolymer salt which comprises dissolving a mixture of 40 to 98% of methacrylic acid and 60 to 2% of a methacrylic acid ester of an alcohol containing not more than 5 carbon atoms in a solvent therefor, adding benzoyl peroxide and subsequently polymerizing the compounds by heating under reflux at the boiling point of the solution and subsequently converting the interpolymer to a water-soluble salt.

5. A process of the manufacture of a water-soluble interpolymer salt which comprises dispersing a mixture of 40 to 98% of methacrylic acid and 60 to 2% of an ester of methacrylic acid in a non-solvent and subjecting the mixture while thus dispersed to polymerizing conditions and subsequently converting the resulting interpolymer to a water-soluble salt by reacting it with a base.

6. A process for the manufacture of a water-soluble interpolymer salt which comprises subjecting to polymerizing conditions a mixture comprising from 40 to 98% of monomeric methacrylic acid and 60 to 2% of methyl methacrylate and subsequently converting the interpolymer to a water-soluble salt by reacting it with a compound selected from the group consisting of alkali metal and ammonium hydroxides, alkali metal and ammonium carbonates and organic bases.

7. A process for the manufacture of a water-soluble interpolymer salt which comprises subjecting to polymerizing conditions a mixture comprising from 40 to 98% of monomeric methacrylic acid and 60 to 2% of ethyl methacrylate and subsequently converting the interpolymer to a water-soluble salt by reacting it with a compound selected from the group consisting of alkali metal and ammonium hydroxides, alkali metal and ammonium carbonates and organic bases.

8. A process for the manufacture of a water-soluble interpolymer salt which comprises subjecting to polymerizing conditions a mixture comprising from 40 to 98% of monomeric methacrylic acid and 60 to 2% of isobutyl methacrylate and subsequently converting the interpolymer to a water-soluble salt by reacting it with a compound selected from the group consisting of alkali metal and ammonium hydroxides, alkali metal and ammonium carbonates and organic bases.

9. A process for the manufacture of a water-soluble interpolymer salt which comprises subjecting to polymerizing conditions a mixture containing from 40-98% of methacrylic acid and 60-2% of at least 1 compound of the group consisting of the nitrile, amide and esters of methacrylic acid and subsequently converting the resulting interpolymer to a water-soluble salt by reacting it with a compound selected from the group consisting of alkali metal and ammonium hydroxides, alkali metal and ammonium carbonates and organic bases.

10. A water-soluble salt of an interpolymer prepared by polymerizing a mixture of from 30 to 98% of methacrylic acid and of from 70-2% of a compound selected from the group consisting of nitriles, amides, and esters of methacrylic acid, the mixtures containing from 30-40% methacrylic acid being polymerized to interpolymers of molecular weight at least as low as that obtained by refluxing the mixture in toluene and in the presence of 1% benzoyl peroxide, based on the total weight of polymerizable compounds present, for approximately 12 hours.

11. A water-soluble salt of an interpolymer prepared by polymerizing 65-85% methacrylic acid and 35-15% of an ester of methacrylic acid.

12. A water-soluble salt of an interpolymer prepared by polymerizing 75% methacrylic acid and 25% methyl methacrylate.

13. An alkali metal salt of an interpolymer of claim 10.

LEO PHILLIP HUBBUCH.